United States Patent
Hwang

(10) Patent No.: US 10,995,284 B2
(45) Date of Patent: May 4, 2021

(54) PROCESS FOR REDUCING THE BENZENE CONTENT OF GASOLINE

(71) Applicant: BADGER LICENSING LLC, Boston, MA (US)

(72) Inventor: Shyh-Yuan H. Hwang, Cambridge, MA (US)

(73) Assignee: BADGER LICENSING LLC, Boston, MA (US)

( * ) Notice: Subject to any disclaimer, the term of this patent is extended or adjusted under 35 U.S.C. 154(b) by 0 days.

(21) Appl. No.: 16/092,563

(22) PCT Filed: Apr. 26, 2016

(86) PCT No.: PCT/US2016/029354
§ 371 (c)(1),
(2) Date: Oct. 10, 2018

(87) PCT Pub. No.: WO2017/188934
PCT Pub. Date: Nov. 2, 2017

(65) Prior Publication Data
US 2019/0119584 A1    Apr. 25, 2019

(51) Int. Cl.
*C10G 61/10* (2006.01)
*C10G 29/20* (2006.01)
(Continued)

(52) U.S. Cl.
CPC .......... *C10G 61/10* (2013.01); *B01J 29/7007* (2013.01); *B01J 29/7038* (2013.01); *C10G 7/02* (2013.01);
(Continued)

(58) Field of Classification Search
None
See application file for complete search history.

(56) References Cited

U.S. PATENT DOCUMENTS 5,149,894 A    9/1992  Holtermann et al.
5,336,820 A    8/1994  Owen et al.
(Continued)

FOREIGN PATENT DOCUMENTS

EP    0780458 A2     6/1997
WO    2012108926 A1  8/2012

OTHER PUBLICATIONS

International Search Report and Written Opinion dated Jan. 18, 2017 in a corresponding application PCT/US2016/029354.

*Primary Examiner* — Tam M Nguyen
(74) *Attorney, Agent, or Firm* — Roberts Calderon Safran & Cole P.C.

(57) ABSTRACT

A process is described for reducing the level of benzene in a refinery gasoline feed containing benzene and at least one $C_{5+}$ olefin, in which the refinery gasoline feed is contacted with a first alkylation catalyst under conditions effective to react at least part of the $C_{5+}$ olefin and benzene in the refinery gasoline feed and produce a first alkylation effluent. The first alkylation effluent is separated into at least (i) a first fraction rich in benzene, (ii) a second fraction rich in $C_7$ to $C_{12}$ hydrocarbons and (iii) a third fraction rich in $C_{13+}$ hydrocarbons. At least part of the first fraction is contacted with an alkylating agent comprising one or more $C_2$ to $C_4$ olefins in the presence of a second alkylation catalyst under conditions effective to produce a second alkylation effluent which has reduced benzene content as compared with the first fraction.

20 Claims, 1 Drawing Sheet

(51) Int. Cl.
    *B01J 29/70*           (2006.01)
    *C10G 7/02*            (2006.01)
    *C10G 35/095*        (2006.01)

(52) U.S. Cl.
    CPC ......... *C10G 29/205* (2013.01); *C10G 35/095* (2013.01); *C10G 2300/1092* (2013.01); *C10G 2400/02* (2013.01); *C10G 2400/30* (2013.01)

(56) References Cited

U.S. PATENT DOCUMENTS

| | | |
|---|---|---|
| 5,347,061 A | 9/1994 | Harandi et al. |
| 5,545,788 A | 8/1996 | Cheng et al. |
| 7,476,774 B2 | 1/2009 | Umansky et al. |
| 2017/0321134 A1 | 11/2017 | Hwang et al. |

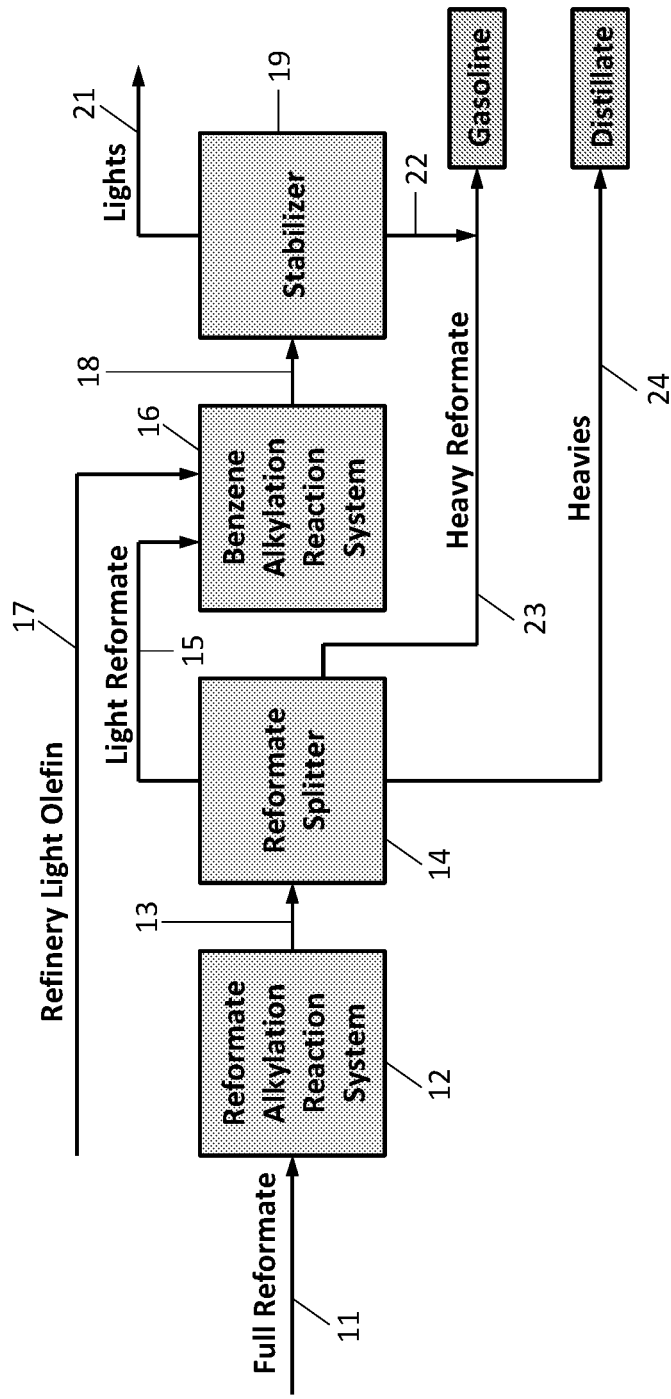

PROCESS FOR REDUCING THE BENZENE CONTENT OF GASOLINE

CROSS-REFERENCE TO RELATED APPLICATIONS

The present application is a U.S. National Phase of PCT/US2016/029354 filed on Apr. 26, 2016. The disclosure of the PCT Application is hereby incorporated by reference into the present Application.

FIELD

This invention relates to a process for reducing the benzene content of gasoline.

BACKGROUND

Benzene is considered to be environmentally hazardous. As a result, the State of California and the United States Environmental Protection Agency have instituted regulations to limit the amount of benzene which may be present in gasoline. As from January 2011, the US MSAT-2 (Mobile Source Air Toxics) regulation has required reduction of the annual average benzene content in gasoline to no greater than 0.62 volume %.

One known route for reducing the benzene content of gasoline is to selectively alkylate the benzene using a lower olefin. For example, U.S. Pat. No. 5,149,894 describes a process for converting benzene to alkylated benzenes in a gasoline blend stock. The process involves contacting a benzene-containing gasoline blend stock with a $C_2$ to $C_4$ olefin stream in the presence of a catalyst containing the zeolite, SSZ-25, to produce an alkylated light hydrocarbon stream with reduced benzene content.

U.S. Pat. No. 5,545,788 describes a process for the production of a more environmentally suitable gasoline by removing a substantial portion of the benzene in gasoline by alkylation of reformate. The process involves alkylation using a light olefin feed at low temperature over the zeolite catalyst, MCM-49.

U.S. Pat. No. 7,476,774 describes a process where light olefins including ethylene and propylene are extracted from refinery off-gases, such as from a catalytic cracking unit, into a light aromatic stream, such as a reformate containing benzene and other single ring aromatic compounds, which is then reacted with the light olefins to form a gasoline boiling range product containing alkylaromatics. The alkylation reaction is carried out in the liquid phase with a catalyst which preferably comprises a member of the MWW family of zeolites, such as MCM-22, using a fixed catalyst bed.

However, in addition to limiting the benzene level in gasoline, current and ongoing regulations restrict the content of residue, which consists of heavy hydrocarbon components with boiling points outside the gasoline boiling range. The US standard specification for automotive spark-ignition engine fuel (ASTM D4814) requires that the residue (heavies) in the gasoline product is no more than 2 volume %. Moreover, some refiners have low gasoline endpoint requirements such that, at high benzene conversion during reformate alkylation, the alkylation product may not be fully blendable into the gasoline pool at these refineries. This is believed to be at least partially due to the presence in the reformate feed of $C_5$ and heavier olefins, such as $C_5$-$C_8$ olefins, which, during alkylation, can react with the benzene in the reformate in addition to the added light olefins to produce non-blendable $C_{13}$ and heavier components.

There is therefore a need for improved processes for reducing the benzene content of gasoline which minimize the formation of $C_{13}$ and heavier components, while maximizing the amount of the reformate feed available for blending into the gasoline pool.

SUMMARY

According to the present invention, it has now been found that the undesirable formation of heavy components in the alkylation of a benzene-containing refinery gasoline stream, such as a reformate fraction or light naphtha, with an olefin alkylating agent can be reduced by initially reacting the $C_5$ and heavier olefins present in the gasoline stream with part of the benzene component of the gasoline stream in the presence of an alkylation catalyst. The effluent from this initial reaction step can then be separated, for example by distillation, into a first fraction rich in benzene and lighter components, a second fraction rich in $C_7$ to $C_{12}$ aromatic and paraffinic components, and a third fraction rich in the $C_{13}$ and heavier components. The first fraction can then be supplied to an alkylation unit for reaction with added light olefins to further reduce the benzene content of the gasoline, while the second fraction can be blended directly into the gasoline pool. If desired, the third fraction can be used as a distillate blending stock.

Thus, in one aspect, the invention resides in a process for reducing the level of benzene in a refinery gasoline feed containing benzene and at least one $C_{5+}$ olefin, said process comprising:

(a) contacting the refinery gasoline feed with a first alkylation catalyst under conditions effective to react at least part of the $C_{5+}$ olefin and benzene in the refinery gasoline feed and produce a first alkylation effluent;

(b) separating the first alkylation effluent into at least (i) a first fraction rich in benzene, (ii) a second fraction rich in $C_7$ to $C_{12}$ hydrocarbons and (iii) a third fraction rich in $C_{13+}$ hydrocarbons; and (c) contacting at least part of the first fraction with an alkylating agent comprising one or more $C_2$ to $C_4$ olefins in the presence of a second alkylation catalyst under conditions effective to produce a second alkylation effluent which has reduced benzene content as compared with the first fraction It is to be appreciated that when a stream is described herein as being "rich" in a specified species, it is meant that the specified species in that stream is enriched relative to other streams in the same system on a weight percentage basis. For illustration purposes only, a first fraction being rich in benzene originating from the first alkylation effluent will have a benzene wt % greater than the first alkylation effluent, the second fraction, or the third fraction.

BRIEF DESCRIPTION OF THE DRAWING

FIG. 1 is a schematic flow diagram of a process for reducing the level of benzene in a refinery gasoline feed according to one embodiment of the invention.

DETAILED DESCRIPTION OF THE EMBODIMENTS

Refinery gasoline streams are blends of different hydrocarbon products generated by various processes in the refinery, particularly catalytic reforming and fluid catalytic cracking. Suitable refinery streams for use in the present process have a boiling range at atmospheric pressure from 0° C. to 250° C. Most of these streams contain some level of benzene so that, without treatment, typical refinery gasoline streams contain at least 1 volume % benzene, often at least 4 volume % benzene, such as from 4 volume % to 60 volume % benzene. With the introduction of the US MSAT-2 (Mobile Source Air Toxics) regulations, there is a need to reduce the level of benzene in refinery gasoline streams to an average, annual value of no more than 0.62 volume %.

In addition to limiting the benzene level in gasoline, current and ongoing regulations restrict the content of residue, namely heavy hydrocarbon components with boiling points outside the gasoline boiling range. For example, the US standard specification for automotive spark-ignition engine fuel (ASTM D4814) requires that the residue in the gasoline product is no more than 2 volume %. In addition, some refineries have low gasoline endpoint requirements such that, at high benzene conversion during reformate alkylation, the alkylation product may not be fully blendable into the gasoline pool at these refineries. Thus, any process for reducing the benzene level in refinery gasoline should also avoid excessive generation of heavy by-products.

One potential source of heavies production during treatment of refinery gasoline streams to reduce benzene levels is $C_{5+}$ olefins, such as $C_5$-$C_8$ olefins, also present in most refinery gasoline streams. Thus, for example, reformate streams blended into the refinery gasoline pool typically contain at least 0.1 volume %, such as from 0.1 volume % to 10.0 volume %, of $C_{5+}$ olefins.

According to the present invention, it has now been found that the joint goal of benzene reduction without excessive heavies production can be achieved by contacting a refinery gasoline feed containing benzene and one or more $C_{5+}$ olefins with a first alkylation catalyst in a first alkylation zone under conditions such that at least part, and preferably all, of the $C_{5+}$ olefins in the feed react with part of benzene in the feed to produce $C_{11+}$ hydrocarbons. The effluent from this first alkylation step, referred to herein as the first alkylation effluent, is then fed to a separation system, where the first alkylation effluent is separated into at least (i) a first fraction rich in benzene, (ii) a second fraction rich in $C_7$ to $C_{12}$ hydrocarbons and (iii) a third fraction rich in $C_{13+}$ hydrocarbons. At least part of the first fraction is then contacted with an alkylating agent selected from one or more $C_2$ to $C_4$ olefins in a second alkylation step in the presence of a second alkylation catalyst under conditions effective to produce a second alkylation effluent which has reduced benzene content as compared with the first fraction and the refinery gasoline feed. The second alkylation effluent and the second fraction can then be directly blended into the refinery gasoline pool, whereas the third fraction can be blended into the refinery distillate pool.

In one embodiment, the refinery gasoline feed employed in the present process is derived from a reformate, that is the product obtained when petroleum naphtha is contacted with a supported hydrogenation/dehydrogenation catalyst in a catalytic reformer. The resulting reformate is a complex mixture of paraffinic and aromatic hydrocarbons and in most refineries this mixture is supplied to a distillation system, normally called a reformate splitter, to separate the mixture into a plurality of different boiling range fractions, including a fraction that eventually passes into the gasoline pool. It is to be appreciated that the first alkylation step of the present process, in which benzene and one or more $C_{5+}$ olefins in the feed are reacted to produce $C_{11+}$ hydrocarbons, can be conducted either downstream or upstream of the reformate splitter. In the latter case, the reformate splitter can be used to separate the first alkylation effluent into the desired first, second and third fractions.

As used herein, the term "$C_n$" compound (olefin or hydrocarbon) wherein n is a positive integer, e.g., 1, 2, 3, 4, 5, etc, means a compound having n number of carbon atom(s) per molecule. The term "$C_{n+}$" compound wherein n is a positive integer, e.g., 1, 2, 3, 4, 5, etc, means a compound having at least n number of carbon atom(s) per molecule. The term "$C_{n-}$" compound wherein n is a positive integer, e.g., 1, 2, 3, 4, 5, etc, as used herein, means a compound having no more than n number of carbon atom(s) per molecule.

First Alkylation Step

Any known alkylation catalyst can be used in the first alkylation step, including both homogeneous and heterogeneous catalysts. In most embodiments, a heterogeneous catalyst, such as a solid acid catalyst, is preferred. Suitable solid acid catalysts include both acidic clays, such as BASF F-24X and F-25X clays and molecular sieves, both naturally-occurring and synthetically produced.

In one embodiment, the alkylation catalyst employed in the first alkylation step comprises at least one medium pore molecular sieve having a Constraint Index of 2-12 (as defined in U.S. Pat. No. 4,016,218). Suitable medium pore molecular sieves include ZSM-5, ZSM-11, ZSM-12, ZSM-22, ZSM-23, ZSM-35, and ZSM-48. ZSM-5 is described in detail in U.S. Pat. No. 3,702,886 and Re. 29,948. ZSM-11 is described in detail in U.S. Pat. No. 3,709,979. ZSM-12 is described in U.S. Pat. No. 3,832,449. ZSM-22 is described in U.S. Pat. No. 4,556,477. ZSM-23 is described in U.S. Pat. No. 4,076,842. ZSM-35 is described in U.S. Pat. No. 4,016,245. ZSM-48 is more particularly described in U.S. Pat. No. 4,234,231.

In another embodiment, the alkylation catalyst employed in the first alkylation step comprises at least one molecular sieve of the MCM-22 family. As used herein, the term "molecular sieve of the MCM-22 family" (or "material of the MCM-22 family" or "MCM-22 family material" or "MCM-22 family zeolite") includes one or more of:

molecular sieves made from a common first degree crystalline building block unit cell, which unit cell has the MWW framework topology. (A unit cell is a spatial arrangement of atoms which if tiled in three-dimensional space describes the crystal structure. Such crystal structures are discussed in the "Atlas of Zeolite Framework Types", Fifth edition, 2001, the entire content of which is incorporated as reference);

molecular sieves made from a common second degree building block, being a 2-dimensional tiling of such MWW framework topology unit cells, forming a monolayer of one unit cell thickness, preferably one c-unit cell thickness;

molecular sieves made from common second degree building blocks, being layers of one or more than one unit cell thickness, wherein the layer of more than one unit cell thickness is made from stacking, packing, or binding at least two monolayers of one unit cell thickness. The stacking of such second degree building blocks can be in a regular fashion, an irregular fashion, a random fashion, or any combination thereof; and molecular sieves made by any regular or random 2-dimensional or 3-dimensional combination of unit cells having the MWW framework topology.

Molecular sieves of the MCM-22 family include those molecular sieves having an X-ray diffraction pattern including d-spacing maxima at 12.4±0.25, 6.9±0.15, 3.57±0.07 and 3.42±0.07 Angstrom. The X-ray diffraction data used to characterize the material are obtained by standard techniques using the K-alpha doublet of copper as incident radiation and a diffractometer equipped with a scintillation counter and associated computer as the collection system.

Materials of the MCM-22 family include MCM-22 (described in U.S. Pat. No. 4,954,325), PSH-3 (described in U.S. Pat. No. 4,439,409), SSZ-25 (described in U.S. Pat. No. 4,826,667), ERB-1 (described in European Patent No. 0293032), ITQ-1 (described in U.S. Pat. No. 6,077,498), ITQ-2 (described in International Patent Publication No. WO97/17290), MCM-36 (described in U.S. Pat. No. 5,250,277), MCM-49 (described in U.S. Pat. No. 5,236,575), MCM-56 (described in U.S. Pat. No. 5,362,697), UZM-8 (described in U.S. Pat. No. 6,756,030), UZM-8HS (described in U.S. Pat. No. 7,713,513) and mixtures thereof.

In a further embodiment, the alkylation catalyst employed in the first alkylation step comprises one or more large pore molecular sieves having a Constraint Index less than 2. Suitable large pore molecular sieves include zeolite beta, zeolite Y, Ultrastable Y (USY), Ultrahydrophobic Y (UHP-Y), Dealuminized Y (Deal Y), mordenite, ZSM-3, ZSM-4, ZSM-14, ZSM-18, ZSM-20 and mixtures thereof. Zeolite ZSM-3 is described in U.S. Pat. No. 3,415,736. Zeolite ZSM-4 is described in U.S. Pat. No. 4,021,947. Zeolite ZSM-14 is described in U.S. Pat. No. 3,923,636. Zeolite ZSM-18 is described in U.S. Pat. No. 3,950,496. Zeolite ZSM-20 is described in U.S. Pat. No. 3,972,983. Zeolite Beta is described in U.S. Pat. No. 3,308,069, and Re. No. 28,341. Low sodium Ultrastable Y molecular sieve (USY) is described in U.S. Pat. Nos. 3,293,192 and 3,449,070. Ultrahydrophobic Y (UHP-Y) is described in U.S. Pat. No. 4,401,556. Dealuminized Y zeolite (Deal Y) may be prepared by the method found in U.S. Pat. No. 3,442,795. Zeolite Y and mordenite are naturally occurring materials but are also available in synthetic forms, such as TEA-mordenite (i.e., synthetic mordenite prepared from a reaction mixture comprising a tetraethylammonium directing agent). TEA-mordenite is disclosed in U.S. Pat. Nos. 3,766,093 and 3,894,104.

Preferred molecular sieves for the first alkylation step comprise zeolite beta, zeolite Y and molecular sieves of the MCM-22 family, as well as combinations thereof.

The above molecular sieves may be used as the alkylation catalyst in the first alkylation step without any binder or matrix, i.e., in so-called self-bound form. Alternatively, the molecular sieve may be composited with another material which is resistant to the temperatures and other conditions employed in the alkylation reaction. Such materials include active and inactive materials and synthetic or naturally occurring zeolites as well as inorganic materials such as clays and/or oxides such as alumina, silica, silica-alumina, zirconia, titania, magnesia or mixtures of these and other oxides. The latter may be either naturally occurring or in the form of gelatinous precipitates or gels including mixtures of silica and metal oxides. Clays may also be included with the oxide type binders to modify the mechanical properties of the catalyst or to assist in its manufacture. Use of a material in conjunction with the molecular sieve, i.e., combined therewith or present during its synthesis, which itself is catalytically active may change the conversion and/or selectivity of the catalyst. Inactive materials suitably serve as diluents to control the amount of conversion so that products may be obtained economically and orderly without employing other means for controlling the rate of reaction. These materials may be incorporated into naturally occurring clays, e.g., bentonite and kaolin, to improve the crush strength of the catalyst under commercial operating conditions and function as binders or matrices for the catalyst. The relative proportions of molecular sieve and inorganic oxide matrix vary widely, with the sieve content ranging from about 1 to about 90 percent by weight and more usually, particularly, when the composite is prepared in the form of beads, in the range of about 2 to about 80 weight percent of the composite.

The first alkylation step can be conducted in any known reactor system including, but not limited to, a fixed bed reactor, a moving bed reactor, a fluidized bed reactor and a reactive distillation unit. In addition, the reactor may comprise a single reaction zone or multiple reaction zones located in the same or different reaction vessels. Suitable conditions for the first alkylation step comprise a temperature from 50 to 300° C., such as from 120 to 250° C. and a pressure from 100 to 15,000 kPa-a, such as from 1,000 to 7,000 kPa-a. In one embodiment, the temperature and pressure conditions are selected to maintain the refinery gasoline feed substantially in the liquid phase. In the case of a continuous process, suitable weight hourly space velocities include from 0.1 to 100 $hr^{-1}$.

In the first alkylation step, benzene and $C_{5+}$ olefins present in the refinery gasoline feed react to produce $C_{11+}$ hydrocarbons. Preferably, the first alkylation step is conducted so as to effect substantially complete conversion of all the $C_{5+}$ olefins present in the refinery gasoline feed. In addition, the first alkylation step is preferably conducted in the absence of added $C_2$ to $C_4$ olefins, that is in the absence of $C_2$ to $C_4$ olefins added separately from the refinery gasoline feed.

Separation of the First Alkylation Effluent

The first alkylation effluent comprises $C_{11+}$ hydrocarbons produced in the first alkylation step, together with unreacted benzene and the desired gasoline components of the reformate feed. In most embodiments, the first alkylation effluent is substantially free of $C_{5+}$ olefins, that is contains less than 0.5 wt % of $C_{5+}$ olefins, and preferably contains no detectable $C_{5+}$ olefins.

The first alkylation effluent is initially separated into at least (i) a first fraction rich in benzene, (ii) a second fraction rich in $C_7$ to $C_{12}$ hydrocarbons and (iii) a third fraction rich in $C_{13+}$ hydrocarbons. The separation can be conducted in one or more distillation columns but, in one preferred embodiment, is conducted in a single distillation column with the first fraction being removed as an overhead stream from the column, the second fraction being withdrawn as a side draw and the third fraction comprising a bottoms stream.

In some embodiments, the first fraction contains from 1 to 50 wt % benzene, less than 0.5 wt % of $C_{5+}$ olefins and less than 30 wt % of $C_{7+}$ hydrocarbons, with the reminder being predominantly $C_{6-}$ paraffins.

In some embodiments, the second fraction contains less than 1 wt %, preferably less than 0.5 wt %, of benzene and less than 5 wt %, preferably less than 2 wt % of $C_{13+}$ hydrocarbons, with the reminder being predominantly $C_7$ to $C_{12}$ aliphatic and aromatic hydrocarbons.

The third fraction typically contains at least 20 wt % of $C_{13+}$ aliphatic and aromatic hydrocarbons and less than 80 wt % of $C_{12-}$ hydrocarbons.

The first fraction is fed to the second alkylation step described in more detail below, whereas the second fraction can be directly blended into the gasoline pool and the third fraction can be used as a distillate blending stock.

Second Alkylation Step

In the second alkylation step, at least part of the first fraction is contacted with an alkylating agent selected from one or more $C_2$ to $C_4$ olefins in the presence of a second alkylation catalyst under conditions effective to produce a second effluent which has reduced benzene content as compared with the first fraction. The alkylating agent is added to the first fraction separately from the refinery gasoline feed and in one embodiment comprises propylene, such as an olefin mixture comprising at least 10 mol % propylene, and in another embodiment comprises butenes, such as an olefin mixture comprising at least 10 mol % butenes, and in still another embodiment comprising at least 10 mol % propylene and at least 10 mol % butenes.

As in the case of the first alkylation step, any known alkylation catalyst can be used in the second alkylation step, including both homogeneous and heterogeneous catalysts. In most embodiments, a heterogeneous catalyst, such as a solid acid catalyst, is preferred. Suitable solid acid catalysts include both acidic clays, such as BASF F-24X and F-25X clays and molecular sieves, both naturally-occurring and synthetically produced.

In one embodiment, the alkylation catalyst employed in the second alkylation step comprises at least one medium pore molecular sieve having a Constraint Index of 2-12 (as defined in U.S. Pat. No. 4,016,218). Suitable medium pore molecular sieves include ZSM-5, ZSM-11, ZSM-12, ZSM-22, ZSM-23, ZSM-35, and ZSM-48.

In another embodiment, the alkylation catalyst employed in the second alkylation step comprises at least one molecular sieve of the MCM-22 family. Suitable molecular sieves of the MCM-22 family include MCM-22, PSH-3, SSZ-25, ERB-1, ITQ-1, ITQ-2, MCM-36, MCM-49, MCM-56, UZM-8, UZM-8HS and mixtures thereof.

In a further embodiment, the alkylation catalyst employed in the second alkylation step comprises one or more large pore molecular sieves having a Constraint Index less than 2. Suitable large pore molecular sieves include zeolite beta, zeolite Y, Ultrastable Y (USY), Ultrahydrophobic Y (UHP-Y), Dealuminized Y (Deal Y), mordenite, ZSM-3, ZSM-4, ZSM-14, ZSM-18, ZSM-20 and mixtures thereof.

Preferred molecular sieves for the second alkylation step comprise zeolite beta and/or molecular sieves of the MCM-22 family.

The above molecular sieves may be used as the alkylation catalyst in the second alkylation step without any binder or matrix, i.e., in so-called self-bound form. Alternatively, the molecular sieve may be composited with a binder or matrix material which is resistant to the temperatures and other conditions employed in the alkylation reaction. Such materials include active and inactive materials and synthetic or naturally occurring zeolites as well as inorganic materials such as clays and/or oxides such as alumina, silica, silica-alumina, zirconia, titania, magnesia or mixtures of these and other oxides.

As in the case of the first alkylation step, the second alkylation step can be conducted in any known reactor system including, but not limited to, a fixed bed reactor, a moving bed reactor, a fluidized bed reactor and a reactive distillation unit. In addition, the reactor may comprise a single reaction zone or multiple reaction zones located in the same or different reaction vessels. Suitable conditions for the second alkylation step comprise a temperature from 50 to 300° C., such as from 100 to 250° C. and a pressure from 100 to 15,000 kPa-a, such as from 1,000 to 7,000 kPa-a. In one embodiment, the temperature and pressure conditions in the second alkylation step are selected to maintain the reagents substantially in the liquid phase. In the case of a continuous process, suitable weight hourly space velocities include from 0.1 to 100 hr$^{-1}$.

Even with a refinery gasoline feed comprising at least 10 volume % benzene, the product of the second alkylation step may contain less than 2 volume %, typically less than 0.62 volume %, benzene and generally no more than 2 volume %, typically less than 1.8 volume %, of residue.

The invention will now be more particularly described with reference to FIG. 1 of the accompanying drawing, which illustrates a process for producing a gasoline blending stock having a reduced benzene content from reformate. In the process shown, the reformate is supplied by line 11 to a first alkylation reactor 12 where at least part of the benzene and $C_{5+}$ olefins in the reformate are reacted in the presence of a solid acid alkylation catalyst to produce $C_{11+}$ alkylation products. The effluent from the first alkylation reactor 12 is removed via line 13 and fed to a reformate splitter 14, where the effluent is separated at least into a first overhead fraction (typically a $C_{6-}$ containing fraction), a second side draw fraction (typically a $C_7$ to $C_{12}$ containing fraction) and a third bottoms fraction (typically a $C_{13+}$ containing fraction).

The first fraction from the reformate splitter 14 is preferably substantially free of $C_{5+}$ olefins from the reformate but still contains some unreacted benzene. At least part of this fraction is then supplied by line 15 to a second alkylation reactor 16, which also receives a supply of light ($C_2$ to $C_4$) olefin through line 17. The second alkylation reactor 16 contains a solid acid alkylation catalyst and is maintained under conditions such that benzene in the light fraction reacts with the added light olefin to produce predominantly $C_9$ alkylated aromatic products. The effluent from the second alkylation reactor 16 is collected in line 18 and fed to a stabilizer 19, where light gases are removed via line 21 for use as, for example, LPG. The liquid product from the reactor 16 is removed from the stabilizer 19 via line 22. This product contains a low concentration (typically less than 0.62 volume %) of benzene and substantially no $C_{10+}$ hydrocarbons and hence is fully blendable into the gasoline pool.

The second fraction from the reformate splitter 14 is collected in line 23 and combined with the product in line 22 for blending into the gasoline pool. The third fraction from the reformate splitter 14 is collected in line 24 and can be used as a distillate blending stock or supplied to other areas of the refinery.

The following non-limited Examples are provided to further illustrate the process described herein.

EXAMPLE 1

A commercial Full Reformate was treated over a Beta zeolite catalyst in a fixed bed Reactor 1, made from a ¾ inch (19 mm) diameter Schedule 40 Stainless Steel 316 pipe with a total length of 34 inches (864 mm). 33 grams of a Beta zeolite catalyst was loaded into Reactor 1. The catalyst was dried with a stream of pure benzene at 150° C. The commercial Full Reformate feed was introduced into Reactor 1 at 225 grams per hour for 20 days then the flow rate was raised to 335 grams per hour for one day. The reactor inlet temperature was maintained between 198 and 202° C. during this period. The feed and effluent were analyzed by GC and Bromine Number and the results are listed in Table 1 below. The exceedingly low olefin content found in Reactor 1 Effluent showed that the olefinic compounds contained in the reformate feed were essentially completely removed in Reactor 1. GC analyses show that significant amount of heavies was produced by olefins and aromatics in Reactor 1.

TABLE 1

| GC Analysis (%) | Feed Full Reformate | Reactor 1 Effluent | Difference (Reactor 1 Effluent − Feed) |
|---|---|---|---|
| <Benzene | 33.64 | 33.27 | −0.37 |
| Benzene | 5.58 | 5.27 | −0.30 |
| Benzene-Toluene | 11.88 | 11.70 | −0.18 |
| Toluene | 17.05 | 16.63 | −0.43 |
| Toluene − Ethyl Benzene | 4.62 | 4.48 | −0.14 |
| Ethyl Benzene + Xylenes | 18.05 | 17.58 | −0.47 |
| Cumene + n-Propyl Benzene | 0.85 | 0.77 | −0.08 |
| n-Propyl Benzene − Diisopropyl Benzenes | 7.99 | 8.12 | +0.13 |
| Diisopropyl Benzenes | 0.09 | 0.21 | +0.11 |
| Diisopropyl Benzenes − Triisopropyl Benzenes | 0.12 | 0.74 | +0.62 |
| Triisopropyl Benzenes | 0.00 | 0.12 | +0.12 |
| >TIPB (Triisopropyl Benzenes) | 0.13 | 1.11 | +0.98 |
| Bromine Number, (g/100 g) | 1.6 | 0.014 | |
| Olefin (%) estimated | 0.7 | <0.01 | |

EXAMPLE 2

Another commercial Full Reformate was treated over an MCM-22 family catalyst in the same fixed bed Reactor 1 used in Example 1. 30 grams of an MCM-22 family catalyst was loaded into Reactor 1. The catalyst was dried with a stream of pure benzene at 150° C. The commercial Full Reformate feed was introduced into Reactor 1 at 225 grams per hour. The reactor inlet temperature was maintained between 198 and 200° C. during this period. The feed and effluent were analyzed by GC and Bromine Number and the results are listed in Table 2 below. The exceedingly low olefin content found in Reactor 1 Effluent showed that the olefinic compounds contained in the reformate feed were essentially completely removed in Reactor 1. GC analyses show that significant amount of heavies was produced by olefins and aromatics in Reactor 1.

TABLE 2

| GC Analysis (%) | Feed Full Reformate | Reactor 1 Effluent | Difference (Reactor 1 Effluent − Feed) |
|---|---|---|---|
| <Benzene | 31.99 | 31.72 | −0.28 |
| Benzene | 5.86 | 5.62 | −0.23 |
| Benzene-Toluene | 12.09 | 11.93 | −0.16 |
| Toluene | 17.47 | 17.07 | −0.40 |
| Toluene − Ethyl Benzene | 4.73 | 4.65 | −0.08 |
| Ethyl Benzene + Xylenes | 18.47 | 18.13 | −0.33 |
| Cumene + n-Propyl Benzene | 0.87 | 0.82 | −0.05 |
| n-Propyl Benzene − Diisopropyl Benzenes | 8.20 | 8.12 | −0.08 |
| Diisopropyl Benzenes | 0.04 | 0.05 | +0.02 |
| Diisopropyl Benzenes − Triisopropyl Benzenes | 0.16 | 0.77 | +0.61 |
| Triisopropyl Benzenes | 0.00 | 0.02 | +0.02 |
| >TIPB (Triisopropyl Benzenes) | 0.13 | 1.08 | +0.95 |
| Bromine Number, (g/100 g) | 1.7 | 0.001 | |
| Olefin (%) estimated | 0.7 | <0.01 | |

EXAMPLE 3

For this example, a computer simulation of a Reformate Splitter column was carried out using the PD-PLUS Chemical Process Simulator with the Soave modified Redlich-Kwong (SRK) Equation of State (EOS).

The Reformate Splitter had 16 theoretical stages and was equipped with a reboiler (stage 1) and a condenser. A 10,000 Kg/hr feed with the composition of Reactor 1 Effluent in Example 1 was fed into the column at stage 10 and the column was operated at an overhead pressure of 1 psig and a reboiler pressure of 4 psig. The reflux ratio was 2.3:1.

A Light Reformate stream of 3,981 Kg/hr comprising 13% benzene and 87% $C_4$-$C_7$ saturated non-aromatic hydrocarbons was taken as an overhead liquid distillate product at 48° C. This stream could be fed to the benzene alkylation reaction system to produce a gasoline blending stock with low benzene and heavies contents.

A Heavy Reformate stream of 5,865 Kg/hr comprising 0.2% $C_6$ saturated non-aromatic compounds, 0.4% benzene, 98.2% $C_7$-$C_{12}$ hydrocarbons, 0.6% $C_{13}$-$C_{15}$ hydrocarbons, and 0.6% heavies (>Triisopropyl Benzenes) was taken as a liquid sidedraw product at stage 4 at a temperature of 125° C. This Heavy Reformate stream had very low benzene and heavies contents and could be used as a gasoline blending stock.

A Heavies stream of 154 Kg/hr comprising 17% $C_8$-$C_{12}$ hydrocarbons, 32% $C_{13}$-$C_{15}$ hydrocarbons, and 51% heavies (>Triisopropyl Benzenes) was taken as a bottoms product at a temperature of 234° C. This Heavies stream could be used as a distillate blending stock.

EXAMPLE 4

The Reactor 1 Effluent collected in Example 1 was distilled in a distillation pilot plant to produce a Light Reformate stream comprising 13% Benzene and 87% $C_4$-$C_7$ saturated non-aromatic compounds for use in this benzene alkylation test. No olefin was detected in this Light Reformate stream.

A benzene alkylation test of the Light Reformate stream with propylene was carried out in a fixed bed Reactor 2, made from a ¾ inch (19 mm) diameter Schedule 40 Stainless Steel 316 pipe with a total length of 34 inches (864 mm). A positive displacement pump was used for feeding the Light Reformate into the reactor and another positive displacement pump was used for feeding propylene into the reactor. A portion of the reactor effluent was recycled back to the reactor inlet by a centrifugal pump to control the temperature rise across the catalyst bed.

30 grams of an MCM-22 family catalyst was loaded into Reactor 2 and dried with a stream of pure benzene at 150° C. before the Light Reformate was introduced. The propylene feed was introduced into Reactor 2 at 9 grams per hour and the reactor inlet temperature was maintained between 198 and 202° C. The reactor recycle was adjusted to control the temperature rise across the catalyst bed below 20° C. Flow rate of Light Reformate was adjusted to achieve different benzene conversions. The feedstock and reactor effluent were analyzed by GC. The results are shown in Table 3 and demonstrate that the Reactor 2 effluent had low benzene and heavies contents.

TABLE 3

| | Reactor 2 Feed − Light Reformate | Reactor 2 Effluent | Reactor 2 Effluent | Reactor 2 Effluent |
|---|---|---|---|---|
| Benzene (%) | 13 | 1.8 | 1.1 | 0.7 |
| Benzene Conversion (%) | | 85 | 91 | 94 |
| Heavies (>Triisopropyl Benzenes) (%) | | 0.5 | 1.0 | 1.4 |

The invention claimed is:

1. A process for reducing the level of benzene in a refinery gasoline feed containing benzene and at least one $C_{5+}$ olefin, said process comprising:
   (a) contacting the refinery gasoline feed with a first alkylation catalyst under conditions effective to react at least part of the $C_{5+}$ olefin and benzene in the refinery gasoline feed and produce a first alkylation effluent;
   (b) separating the first alkylation effluent into at least (i) a first fraction rich in benzene, (ii) a second fraction rich in $C_7$ to $C_{12}$ hydrocarbons and (iii) a third fraction rich in $C_{13+}$ hydrocarbons; and
   (c) contacting at least part of the first fraction with an alkylating agent comprising one or more $C_2$ to $C_4$ olefins in the presence of a second alkylation catalyst under conditions effective to produce a second alkylation effluent which has reduced benzene content as compared with the first fraction.

2. A process according to claim 1, wherein the refinery gasoline feed has a boiling range at atmospheric pressure from 0° C. to 250° C.

3. A process according to claim 1, wherein the refinery gasoline feed is a reformate or a fraction thereof.

4. A process according to claim 1, wherein the refinery gasoline feed comprises at least 1 volume % benzene.

5. A process according to claim 1, wherein the first catalyst comprises a solid acid catalyst.

6. A process according to claim 1, wherein the first catalyst comprises an acidic clay.

7. A process according to claim 1, wherein the first catalyst comprises a molecular sieve.

8. A process according to claim 1, wherein the first catalyst comprises zeolite beta, zeolite Y, or a zeolite of the MCM-22 family.

9. A process according to claim 1, wherein conditions in the contacting (a) are sufficient to maintain the refinery gasoline feed substantially in the liquid phase.

10. A process according to claim 1, wherein conditions in the contacting (a) comprise a temperature from 50 to 300° C.

11. A process according to claim 1, wherein the contacting (a) is conducted in the absence of added $C_2$ to $C_4$ olefins.

12. A process according to claim 1, wherein the first alkylation effluent contains less than 0.5 wt % of $C_{5+}$ olefins.

13. A process according to claim 1, wherein the separating (b) comprises distillation.

14. A process according to claim 1, wherein the separating (b) is conducted in a single distillation column with the first fraction comprising an overhead stream, the second fraction comprising a side-draw stream and the third fraction comprising a bottoms stream.

15. A process according to claim 1, wherein the second fraction contains less than 1 wt % benzene.

16. A process according to claim 1, wherein the second fraction contains less than 2 wt % $C_{13+}$ hydrocarbons.

17. A process according to claim 1, wherein the alkylating agent comprises propylene.

18. A process according to claim 1, wherein the second catalyst comprises zeolite beta or a zeolite of the MCM-22 family.

19. A process according to claim 1, wherein conditions in the contacting (c) are sufficient to maintain the second alkylation effluent substantially in the liquid phase.

20. A process according to claim 1 and further comprising:
   (d) combining the second fraction and second alkylation effluent into the gasoline pool.

* * * * *